United States Patent [19]

Wright et al.

[11] Patent Number: 4,677,578

[45] Date of Patent: Jun. 30, 1987

[54] NON-CONTACT SENSING SYSTEM FOR DETERMINING THE RELATIVE ELONGATION IN A MOVING FLAT STEEL STRIP

[75] Inventors: Wade S. Wright, Fairfield; John T. Voisine, Middletown, both of Ohio; Glenn S. Huppi, Golden, Colo.

[73] Assignee: Armco Inc., Middletown, Ohio

[21] Appl. No.: 658,137

[22] Filed: Oct. 5, 1984

Related U.S. Application Data

[63] Continuation-in-part of Ser. No. 365,791, Apr. 5, 1982, Pat. No. 4,476,430.

[51] Int. Cl.$^4$ .................... G01B 7/08; G06F 15/46; G06G 7/48; G01R 27/26
[52] U.S. Cl. .................... 364/562; 364/472; 364/552; 324/61 R
[58] Field of Search .............. 364/506, 507, 552, 561, 364/562, 472; 340/870.37; 324/61 R

[56] References Cited

U.S. PATENT DOCUMENTS

| | | | |
|---|---|---|---|
| 2,950,436 | 8/1960 | Butticaz et al. | 324/61 R |
| 3,042,861 | 7/1962 | Brys | 324/61 R |
| 3,161,824 | 12/1964 | Brys | 324/61 R |
| 3,471,780 | 10/1969 | Beddows | 324/61 R |
| 3,502,968 | 3/1970 | Tobin, Jr. et al. | 324/61 R |
| 3,523,246 | 8/1970 | Hall et al. | 324/61 R |
| 3,764,899 | 10/1973 | Peterson et al. | 324/61 R |
| 3,771,051 | 11/1973 | Abbe | 324/61 R |
| 3,781,672 | 12/1973 | Maltby et al. | 324/61 R |
| 4,182,981 | 1/1980 | Shum et al. | 340/870.37 X |
| 4,261,190 | 4/1981 | Fapiano | 72/6 |
| 4,287,471 | 9/1981 | Ko et al. | 324/61 R |
| 4,288,855 | 9/1981 | Panetti | 364/506 X |
| 4,470,304 | 9/1984 | Nusbickel, Jr. et al. | 73/626 X |
| 4,476,430 | 10/1984 | Wright et al. | 324/61 R |
| 4,495,587 | 1/1985 | Plante et al. | 364/507 |
| 4,519,041 | 5/1985 | Fant et al. | 364/552 |
| 4,543,526 | 9/1985 | Burckhardt | 324/61 R |
| 4,561,064 | 12/1985 | Brüggen et al. | 364/561 |
| 4,571,695 | 2/1986 | Elton et al. | 364/556 X |

FOREIGN PATENT DOCUMENTS

0150937 9/1981 German Democratic Rep. ... 324/61 R

OTHER PUBLICATIONS

Okado et al., A New Shape Control Technique for Cold Strip Mills, Paper Presented at the Rolling Mill Conference of the Association of Iron & Steel Engineers in Cincinnati, Ohio, May 1981, pp. 1-31.
Kokan, NKK-Type Shape Meter for Steel Strip, pp. 1-32.

Primary Examiner—Errol A. Krass
Assistant Examiner—Joseph L. Dixon
Attorney, Agent, or Firm—Frost & Jacobs

[57] ABSTRACT

A system for measuring the relative elongation of portions of a moving steel strip. A number of capacitive sensors positioned above one surface of the moving strip monitor the distance between each sensor and the surface of the strip. This information is processed through a geometrical relationship to calculate the percent relative elongation at one sensing position with respect to another. The calculation may be performed instantaneously, or result from several measurements averaged over a cell length. Provision is made for greater accuracy in cases where waviness of the strip results in the occurrence of more than a predetermined number of waves during a cell length. Wave steepness, wave periodicity, and categorization of relative length information are also provided by the processing.

27 Claims, 11 Drawing Figures

NON-CONTACT SENSING SYSTEM FOR DETERMINING THE RELATIVE ELONGATION IN A MOVING FLAT STEEL STRIP

BACKGROUND OF THE INVENTION

This application is a continuation-in-part of Ser. No. 365,791 filed Apr. 5, 1982, now U.S. Pat. No. 4,476,430 entitled "Non-Contact Sensor For Determining Moving Flat Steel Strip Shape Profile".

The present invention is directed to a method and apparatus for monitoring the relative elongation characteristics of a moving electrically conducting steel or other metallic strip in order to provide a measure of the relative length or elongation of the strip at a number of points across the strip width in order to determine the shape profile. A plurality of sensors located at spaced positions across the width of the strip measure the change in electrical capacitance between the moving strip surface and the sensor due to variations in the flatness of the strip. Electrical output signals from these sensors may then be correlated to provide a measure of the relative length or elongation, or the shape profile, of the strip at each of the sensing positions.

The present invention finds particular utility in connection with processes for manufacturing steel strip. Under some circumstances, and at certain points in the manufacturing process, an unsupported steel strip may exhibit a bowed, drooping, wavy or otherwise non-flat shape profile when viewed in end cross-section. In some cases, a significant length of the strip may be completely unusable if the distortion is extensive. In other applications, the non-uniform elongation of the strip may cause problems as the strip tracks across supporting rollers, or is wound in a coil.

It has been observed that various types of non-flat strip shape profile characteristics may occur during the manufacturing process. Typical types of profile characteristics are illustrated in FIG. 1A–FIG. 1D, where similar elements are similarly designated. In each profile representation, the left-handmost longitudinal strip edge occurring at a position 1 is designated 1a. The longitudinally extending central portion of the strip is designated position 2. The right-handmost longitudinal strip edge occurring at a position 3 is designated 3a. The normal boundaries of the flat strip are designated by the lighter construction lines a, while the actual boundaries of the strip having a particular profile are illustrated in darker lines and designated as indicated hereinafter.

Figure 1A:
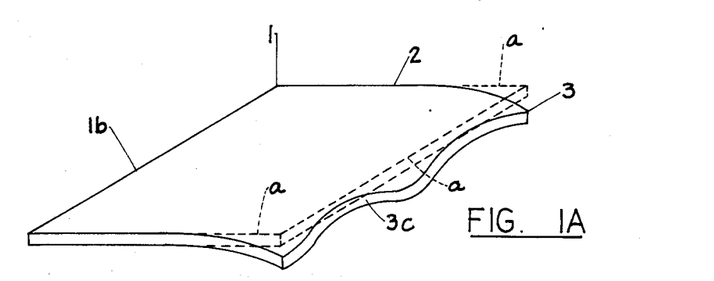
FIGS. 1A-1D are diagrammatic representations of typical non-flat strip shape profiles.

For example, one possible strip shape profile is illustrated diagrammatically in FIG. 1A wherein the right-handmost edge of the strip, designated position 3, droops or sags. This may occur during the rolling operation where variations occur in the cross-sectional profile of the rolling gap. Since the edges of the strip are constrained during the rolling process, resulting transverse variations occur in the elongation of edge 3 of the strip in order to maintain constant volume. In other words, inasmuch as edge 3 is longer than edge 1 and the center 2 of the strip, the longer edge will tend to sag or droop in an unsupported length of the strip and exhibit a wavy edge as at 3c.

Figure 1B:
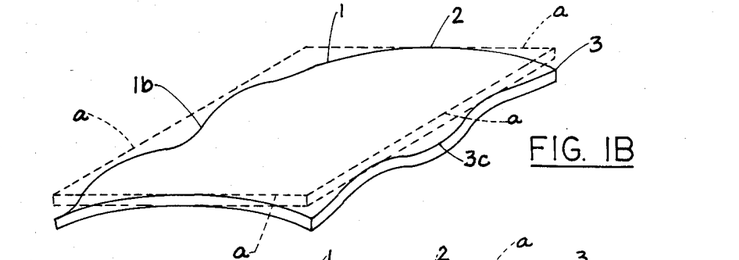

Another variation (generally referred to as a "tight center") is illustrated diagrammatically in FIG. 1B where the longitudinal edges 1 and 3 are longer than the center portion 2. Here it will be observed that both longitudinal edges 1c and 3c are wavy.

Figure 1C:
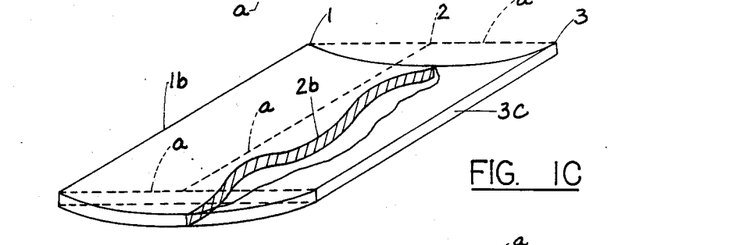

A similar type of condition is illustrated in FIG. 1C where the center portion 2 of the strip is elongated with respect to the longitudinal edges 1 and 3. This results, in an unsupported strip length, in a profile of curvature opposite to that illustrated in FIG. 1B. It is often common to find a wavy portion 2C (sometimes referred to as "pockets") at the center portion of the strip, with straight outer edges 1c and 3c.

Figure 1D:
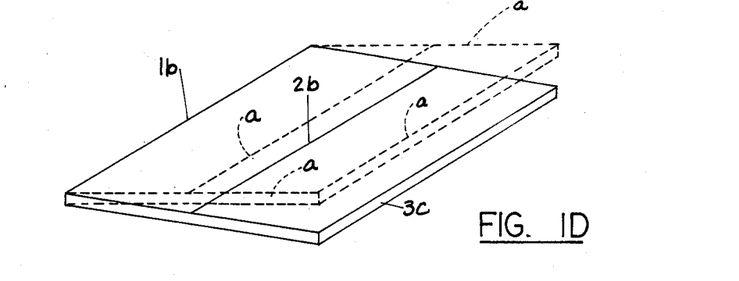

Finally, another possible characteristic profile is illustrated in FIG. 1D, where the right longitudinal edge 3 is longer than center 2, which in turn is longer than the left longitudinal edge 1. This results in a condition where the entire strip droops downwardly from longitudinal edge 1C to right longitudinal edge 3C. This is to be distinguished from the condition illustrated in FIG. 1A wherein there is substantially no relative elongation between strip edge 1 and center portion 2.

It is desirable to be able to continuously monitor the shape profile characteristics of the strip in order to provide a continuous measure of the relative length or elongation at particular points in the processing line. This information, whether it reveals center buckle, long edges or wavy conditions, may be used to provide additional compensation for flattening, or heat treating steps on the processing line, or such information may be stored in a suitable memory for further analysis.

SUMMARY OF THE INVENTION

The present invention is directed to a monitoring system for determining the relative elongation of such steel strip while the strip is moving along a processing line, where speeds may approach several hundred feet per minute or more. The sensors used with such steel strip while the strip is moving along a processing line, where speeds may approach several hundred feet per minute or more. The sensors used with the monitoring system are placed out of contact with the strip surface to eliminate wear of the sensors, prevent abrasion or scratching of the strip surface or of the coating which may be placed thereon, and avoid altering the shape profile.

In general, sensors for monitoring steel strip materials have been suggested by prior art workers. For example, U.S. Pat. No. 3,161,824 issued Dec. 15, 1964 to H. E. Brys describes a method for measuring the flatness of steel materials without actually contacting the material by means of one or more wound coils which monitor changes in the permeability of the magnetic circuit formed as the material passes adjacent to the sensing coil. The changes in permeability measured may then be related to deviations in the flatness of the material.

In another type of method described in U.S. Pat. No. 3,502,968 issued Mar. 24, 1970 to H. G. Tobin, Jr., et al, a high frequency coil induces eddy currents in the surface of a moving sheet of material with pick-up coils sensing changes in the eddy current level in the sheet due to variations in the flatness.

While such inductive and eddy current measuring systems are satisfactory for small deviations, it has been found that they may produce inaccurate results for relatively large deviations of the order of several inches, for example. Furthermore, such methods are non-linear and are sensitive to the magnetic properties of the particular material being measured.

Several types of non-contact capacitive sensors have also been suggested for measuring changes in capacitance between the sensor and a surface. For example, East German Pat. No. 150,937 illustrates a capacitive measurement sensor system for determining the height profile and the position of the edge of semiconductor wafers.

U.S. Pat. No. 2,950,436 describes a system which measures irregular flow during processing of a textile material. The change in mass or thickness of the material passing betweeen two condensor plates changes the dielectric constant in order to provide a measure of the capacitance, which is proportional to the mass.

In U.S. Pat. No. 3,764,899, the thickness of a plastic film passing between two plates causes a change in frequency.

U.S. Pat. No. 3,523,246 measures irregularities in thickness of partly conductive test emulsion coatings on photographic film while the coating is still wet. The detected changes in potential occur from within the material at predetermined positions.

U.S. Pat. No. 3,471,780 monitors dieletric film thickness of adhesive or plastic coatings on a uniform sheet of parchment paper or Teflon by means of a capacitance gauge having temperature and moisture compensation.

U.S. Pat. No. 3,771,051 uses a non-contact capacitive probe to measure surface roughness on a rotating roll.

The present invention uses a multiplicity of individual capacitive sensors positioned at spaced locations across the width of the strip. For example, in a system employing three capacitive sensors, one may be located in the middle of the strip, and one sensor may be located at each edge. Each sensor measures the capacitance between itself and the surface of the moving electrically conducting steel strip in order to provide a measure of the change in capacitance at a particular point across the strip width at a particular time. Each capacitive measurement may be related to the distance between the sensor and the surface of the moving strip. By correlating the various strip to sensor distance measurements, a measure of the actual relative length or elongation of the strip may be obtained as will be explained in more detail hereinafter.

In a preferred installation, the strip is supported by a pair of spaced rotatably mounted cylindrical rollers such that the strip is substantially unsupported between the rollers, and thus assumes a catenary curve. As will be explained in more detail hereinafter, by eliminating external stresses or tensions on the strip, the shape profile in the unsupported or catenary length of the curve will reflect the true shape profile of the strip.

In a preferred embodiment, each sensor comprises a generally rectangular flat electrically conducting active plate which is mounted in spaced parallel overlying relationship with the top or bottom major surface of the moving steel strip. A generally flat electrically conducting shield plate is also positioned in spaced parallel overlying relationship with the same major surface of the moving steel strip, and includes a rectangular central opening slightly larger than the active plate. The active plate is positioned within the opening out of electrical contact with the shield plate with the surfaces facing the moving steel strip of both plates coextensive with each other. Consequently, the shield plate reduces the fringing of the electric field produced by the active plate so that the variations in capacitance between the active plate and the surface of the moving steel strip may be measured.

Identical high frequency electrical signals are applied to the active and shield plates. This arrangement prevents the system from being responsive to extraneous changes in capacitance. Changes in capacitance between the active plate and the moving steel strip cause a corresponding change in current from the voltage source. This change in current is converted to a voltage proportional to the inverse of the distance between the active plate of the sensor and the strip. If desired, the voltage may be rectified and low pass filtered to provide a DC voltage also proportional to the inverse of the sensor-strip distance, thereby providing an indication of decreases in spacing.

In a preferred embodiment of the invention illustrated and described herein, the output from each of the sensors is read by a microprocessor at predetermined increments of strip length, for example several inches. In the case of the edge sensors, the output values are averaged over a predetermined strip length or "cell", e.g. 200 feet. These average values are then stored as a deviation value.

The signals resulting from the center sensor are also processed by the microprocessor and averaged over a predetermined strip length or cell. However, the maximum and minimum values measured within each cell by the central sensor are also subjected to processing to determine if a predetermined number of peaks or valleys occur within the cell distance. If this predetermined number of peaks or valleys is exceeded, indicating that the central portion of the strip is relatively "wavy", the average of the peak value is utilized, rather than the average of the nominal values of strip to sensor distance. In practice, as will be explained in more detail hereinafter, this has been found to provide a more accurate result for wavy centers than mere measurement and averaging of the nominal central deviation.

Once this information has been correlated and stored by the microprocessor, the sensor value having the minimum average value is chosen as a reference value. This reference distance value is then subtracted from each of other sensor average values, and the relative length of the strip at each sensor position calculated by means of a trigonometric relationship. The resulting percentage relative length or elongation at each sensor position may then be displayed for each strip cell to provide a continuous indication of the relative flatness characteristics of the steel strip. Alternately, the information may be utilized on a real time basis to cause modification in the processing line parameters to minimize or eliminate non-flat strip profiles. For example, excessive relative length values may be used to predict tracking or coil winding problems, which heretofore were predicted on the basis of visual examination of the strip profile alone. In any event, the present invention may be utilized in any application where quantifying strip shape is important, whether for immediate corrective action or future data reference.

Further features of the invention will become apparent from the detailed description which follows.

DETAILED DESCRIPTION

Figure 2:
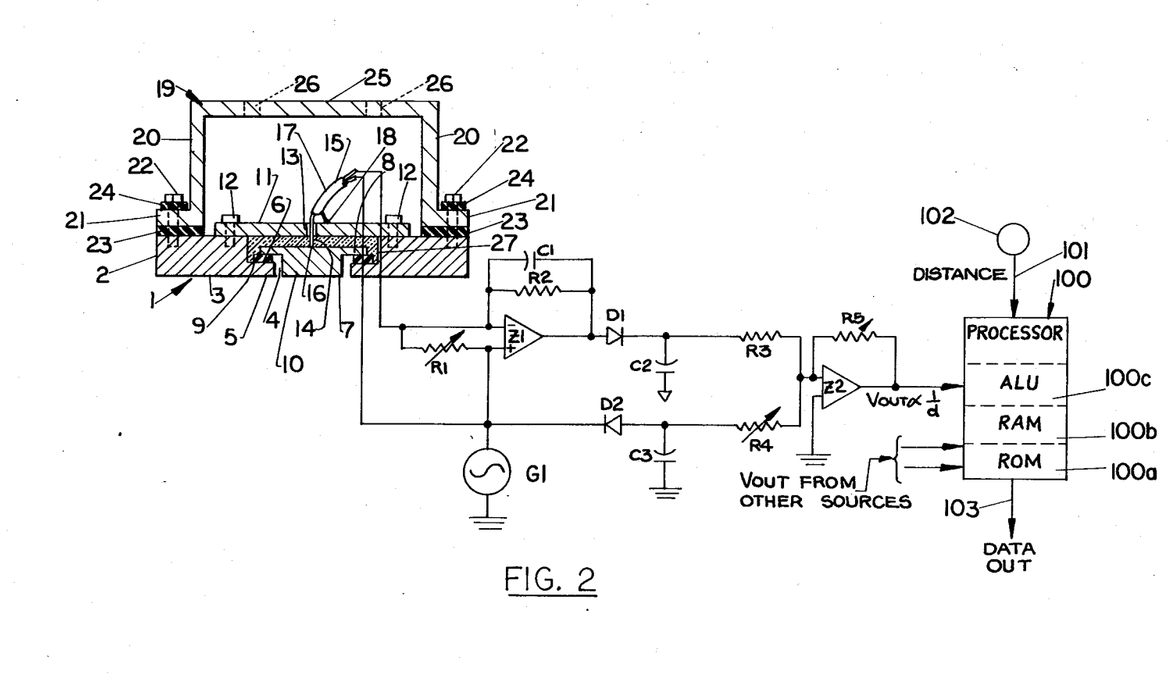
FIG. 2 is a partially cross sectioned front elevational view of a preferred embodiment of one sensor of the present invention and a schematic diagram of the associated signal conditioning electronics used therewith.
Figure 3:
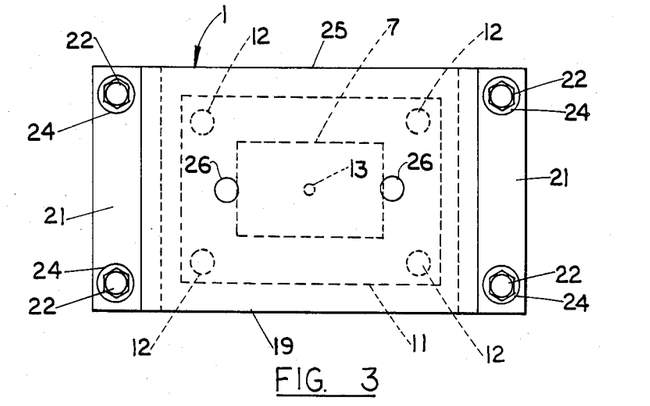
FIG. 3 is a top plan view of the sensor of FIG. 1.
Figure 3A:
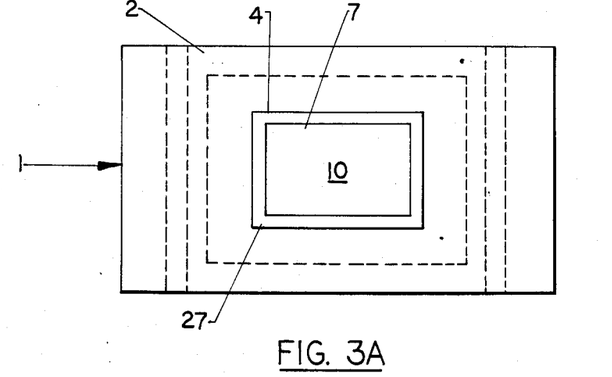
FIG. 3A is a bottom plan view of the sensor of the present invention.
Figure 4:
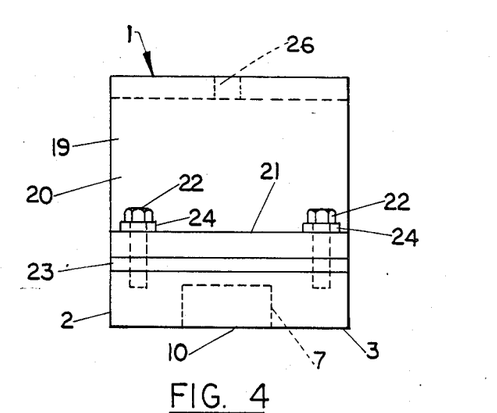
FIG. 4 is an end elevation view of the sensor of FIG. 1.

The preferred embodiment of capacitive sensor construction to be used in connection with the present invention is illustrated generally at 1 in FIGS. 2–4 Sensor 1 includes a flat shield plate 2 fabricated from any suitable electrically conducting material such as aluminum or the like. The lowermost surface 3 of shield plate 2 which will face the uppermost surface of the moving steel strip is flat. The central portion of shield plate 2 is provided with a rectangular-shaped opening 4 extending completely through the plate. The lower portion of opening 4 adjacent surface 3 is provided with an inwardly directed ledge or shelf 5 having a flat upper surface 6.

Sensor 1 also includes a generally rectangular-shaped active plate 7 which may be fabricated from any suitable electrically conducting material such as aluminum or the like. The upper portion of active plate 7 is provided with an outwardly directed flange 8 having a generally smooth lower surface. An annular electrically non-conducting gasket 9 is positioned on the upper surface 6 associated with shield plate 2 so that the flange 8 may rest on the upper surface of gasket 9. Consequently, the inwardly directed ledge 5 supports active plate 7 while being electrically insulated therefrom. In the embodiment illustrated, active plate 7 and shield plate 2 may be secured together by means of an electrically non-conducting adhesive or the like. It will be observed that the lowermost surface 10 of active plate 7 is substantially coextensive with the lowermost surface 3 of shield plate 2. It will also be understood that other shapes and configurations of the active and shield plates may be used.

A generally flat electrically conducting cover plate 11 overlies opening 4 and is secured around its outer periphery to shield plate 2 by means of screws or the like 12. A central opening 13 is provided through cover plate 11 for admitting the central conductor 14 of coaxial cable or the like 15. Central conductor 14 is electrically secured to the upper surface of active plate 7 as at 16 (see FIG. 2). It will be understood that central conductor 14 is electrically isolated from cover plate 11. The cable shield 17 of coaxial cable 15 is attached to the upper surface of cover plate 11 as at 18. It also will be understood that cable shield 17 may be covered with a suitable electrically non-conducting covering as is well understood in the art.

The upper portion of sensor 1 is provided with a U-shaped support bracket shown generally at 19. Support bracket 19 includes a pair of spaced generally vertically extending flange portions 20 terminating at their lowermost ends in outwardly extending legs 21. Support bracket 19 may be secured to shield plate 2 by a plurality of screws or the like 22 passing through cooperating holes in legs 21 and the upper surface of shield plate 2. As best shown in FIG. 2, support bracket 19 is insulated from shield plate 2 by means of an electrically non-conducting gasket or layer 23 fabricated from rubber, plastic, Teflon or the like positioned between the lower surface of legs 21 and the upper surface of the shield plate 2. Likewise, the upper portion of screws 22 is also insulated as at 24 from legs 21 so as to provide complete electrical isolation between support bracket 19 and shield plate 2.

The upper portion of support bracket 19 which comprises a generally horizontally extending web section 25 is provided with a plurality of apertures 26 for attaching the sensor 1 to a support member overlying the moving steel strip as will be described in more detail hereinafter.

If desired, the open spaces within opening 4 between shield plate 2 and active plate 7 may be filled with a suitable insulating material 27. In any event, it will be understood that active plate 7 is completely electrically isolated from shield plate 2.

Central conductor 14 of coax cable 15 is connected to the inverting input of a high input impedance operational amplifier Z1, while the cable shield 17 is connected to the non-inverting input of amplifier Z1 as well as a high frequency alternating voltage source or oscillator G1, which has a nominal operating frequency of about 100 KHz. A variable resistor R1 is connected between the inverting and non-inverting inputs of amplifier Z1 for temperature compensation. The parallel combination of a resistor R2 and a capacitor C1 is connected between the inverting input and output of the operational amplifier Z1.

The output of amplifier Z1 is connected to the anode of diode D1. The diode D1, capacitor C2 and resistor R3 comprise a peak detector which is connected to the inverting input of operational amplifier Z2. Voltage source or oscillator G1 is connected to the cathode of diode D2. The diode D2, capacitor C3 and variable resistor R4 comprise a peak detector which is connected to the inverting input of amplifier Z2. Variable resistor R4 serves as a zero adjustment. A variable resistor R5 is connected between the inverting input and the output of amplifier Z2 and serves as a gain adjustment, while the non-inverting input of amplifier Z2 is grounded. The voltage, $V_{out}$, which appears at the output of amplifier Z2, is proportional to the inverse of the distance d between the active plate 7 and the outer surface of the moving steel strip.

In operation, substantially the same high frequency signal is applied to the active plate 7 through central conductor 14 of the coax cable 15 and to the shield plate 2 through the cable shield 17. The common mode characteristics of amplifier Z1 as well as the peak detector circuits described hereinabove operate to cancel the common signals between the shield and active plate at the input to amplifier Z2. Strip shape can be more accurately measured by using a peak-to-peak detector which reduces the effect of variations not related to strip shape. The presence of the same high frequency signal on the shield plate and the cover plate tends to eliminate the effects of stray capacitance so that the active plate 7 is responsive only to changes in capacitance between it and the moving steel strip. When such a change in capacitance occurs, the current through resistor R2 and capacitor C1 changes, producing a voltage change at the output of amplifier Z1, which functions similarly to a differentiator. In the case where a positive voltage occurs at this point associated with an increase in capacitance associated with a decrease in the spacing between the active plate and the steel strip, current flow will occur through diode D1 and appear as a voltage change on the output of amplifier Z2 which is proportional to the change in capacitance of the strip.

It is to be understood that any means which reduces the influence of the environment will improve the performance of the system. As an example, a temperature controlled environment would reduce the frequency of calibration and also improve the accuracy between calibrations.

Figure 5:
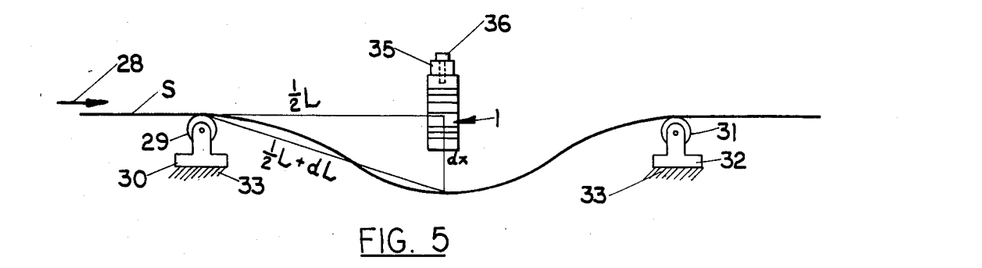
FIG. 5 is a fragmentary partially diagrammatic side elevational view of a preferred mounting arrangement for the strip sensors of the present invention.
Figure 6:
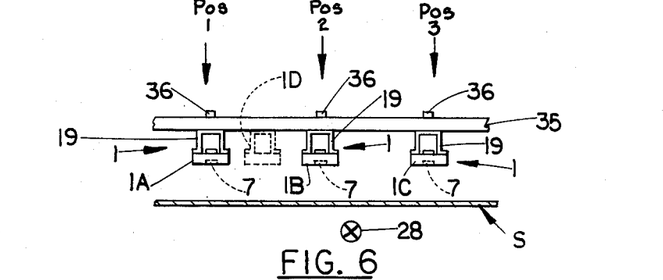
FIG. 6 is a fragmentary front elevational view of a preferred mounting arrangement of the strip sensor of the present invention.

A preferred embodiment of the present invention utilizing a plurality of sensors 1 positioned at spaced locations across the width of the moving steel strip for quantifying the strip shape profile in order to monitor the relative length or elongation of the strip is illustrated in FIG. 5 and FIG. 6, where elements similar to those previously described have been similarly designated.

For purposes of an exemplary showing, the present invention is described and illustrated in connection with the processing of a steel strip S of indefinite length. Typically, the steel strip S of FIG. 5 and FIG. 6 may be produced by hot rolling or cold rolling in previous processing operations, not shown. Furthermore, the steel strip may have been previously subjected to various pickling or heat treating operations as is well known in the art. For purposes of an exemplary showing, the steel strip may comprise a high-permeability grain oriented silicon steel. Finally, although not necessary to the practice of the present invention, steel strip S may be provided with an insulative coating having a high dieletric strength or a mill glass, or both.

Steel strip S moves in the direction of arrow 28 at a substantially constant speed between processing stations as described hereinabove. Typically in a hot roll processing line, the strip speed will be of the order of 250ft/min. In cold roll processing lines, however, the strip speed may be substantially greater. It will be understood that the processing station illustrated in FIG. 5 is associated with the measuring system of the present invention. referred to hereinafter as the measurement station.

At the entrance point to the measurement station, strip S is supported on its underside by means of a cylindrical roller 29 rotatably mounted on a pair of spaced fixedly mounted supports, one of which is shown at 30. In general, roller 29 will be of such length as to extend completely across and support the width of strip S. It will be understood that cylindrical roll 29 may comprise a turn-down roll as is well understood in the art.

Following the point of contact with roller 29, strip S is unsupported over a length L, which will be referred to hereinafter as the "catenary distance".

At the exit point of the measurement station, the strip S is supported on its underside by a second generally cylindrical roller 31, which is rotatably mounted between a pair of upright fixed supports, one of which is shown at 32. In general, roller 31 will also be of sufficient length to extend completely across and support the width of strip S.

Following the point of contact with roller 31, strip S exits the measurement station, and may be subjected to further processing, or wound in a coil as is well known in the art.

As explained hereinabove, it is necessary to the proper functioning of the capacitive sensor 1 that the strip have a very low impedance (i.e. high capacitance) to ground compared to the impedance of the sensor 1. Although not necessary in particular applications, one way of assuring such a very low relative impedance is by electrically grounding supports 30 and 32 as at 33.

As noted hereinabove, the strip S is unsupported over the catenary distance L, and thus hangs freely in a catenary curve between the points of support comprising the points of contact with support rollers 29 and 31. This is necessary to assure that the strip shape monitored by sensors 1 as will be described hereinafter is the actual transverse profile of the strip. Since it is important that the strip hang freely over the catenary distance L, so that the profile shape is not distorted by external forces, it is desirable to minimize factors upstream or downstream of the measurement station that may affect the shape in the catenary distance L. The effect of such external factors can be minimized by eliminating excess tension on the strip, or by isolating the measurement station from other rolls which may be located downstream of the measurement station for correcting tracking of the strip as is well known in the art. Equally as important, supporting rollers 29 and 31 should be located at substantially the same horizontal level with respect to the moving strip, and their axes of rotation should be parallel and perpendicular to the direction of travel of strip S. By isolating these external factors, the catenary shape that the strip S assumes in the catenary distance will reflect the true transverse profile shape of the strip.

While for purposes of an exemplary showing, sensors 1 have been described and illustrated as positioned above the strip, it will be understood that they may alternatively be positioned beneath the strip, or in any other position where the outer surface of active plate 7 is spaced in parallel relationship with a major surface of the moving strip.

In the embodiment illustrated in FIG. 5 and FIG. 6, three sensors 1A, 1B and 1C (of the construction previously described for sensor 1) have been utilized spanning the width of the strip. However, it will be understood more sensors 1 may be used depending on the resolution of strip flatness characteristics desired, or alternatively, a greater number of sensors 1 may be placed in a particular area of interest of the strip, such as the quarter buckle region, as illustrated diagrammatically by sensor 1D FIG. 6. Furthermore, other types of sensors producing outputs representative of the distance between the sensor and the strip surface may be utilized as well.

An embodiment of the present invention for providing a measurement of the relative strip elongation or length is illustrated in FIGS. 5 and 6. Sensors 1A, 1B and 1C previously described are positioned in closely spaced overlying relationship with the upper surface of strip S.

Each sensor may be attached to a support rod or bar 35 positioned above the strip surface and extending horizontally transversely of the strip width. Each sensor is secured to support bar 35 by means of screws or the like 36 cooperating with holes 26 in support bracket 19 so that the entire sensor depends downwardly from bar 35 and the long dimension of active plate 7 extends transversely to the direction 28 of strip travel.

It will be understood that the construction of each of sensors 1A-1C is similar to that previously described, for example in FIG. 2, such that each sensor produces a voltage output $V_{out}$ which is proportional to the inverse of the distance between the sensor and the strip surface. In order to avoid cross-talk between the sensors, the high frequency oscillator G1 associated with each sensor may be operated at a different frequency, e.g. 95 KHz, 100 KHz and 105 KHz, respectively. Appropriate filters will be included with the circuitry illustrated in FIG. 1 so that each sensor is responsive only to its own high frequency oscillator signal, and not those of the other sensors.

In operation, each sensor is calibrated to operate over the expected range of distances between the sensor and the strip surface, typically about 1–5 inches (25–125 mm). This permits measurement of deviations in the strip surface of up to about ±2 inches (51 mm). As the distance between the upper surface of the strip and the active plate of the sensor varies, the capacitance changes, producing a change in $V_{out}$ as previously described.

The outputs from each of sensors 1 are applied to processor 100, which may be a digital computer, microcomputer, microprocessor or other data processing unit capable of performing the data manipulation and calculations described hereinafter. Thus, as illustrated in FIG. 2, the outputs from the three sensors 1A–1C supply data to processor 100 representative of the instantaneous distance between the particular sensor and the surface of the strip.

Also supplied to processor 100 as a data input on line 101 is a distance signal representative of incremental lengths of the strip S. For example, the distance signal may be derived from a length transducer 102 which supplies a signal to processor 100 representative of the actual length of strip S passing through the measurement station. Thus, a distance signal may be supplied to processor 100 every several inches or millimeters. Alternatively, transducer 102 may monitor the velocity of the strip, from which the incremental strip travel may be derived as a function of time as is well known in the art.

The output data produced from processor 100 on line 103 represents the relative elongation or length of the strip, and may be stored in a suitable storage medium such as a RAM or other memory device for further analysis, or used to control processing parameters of the strip processing line in a manner not shown.

Figure 7:
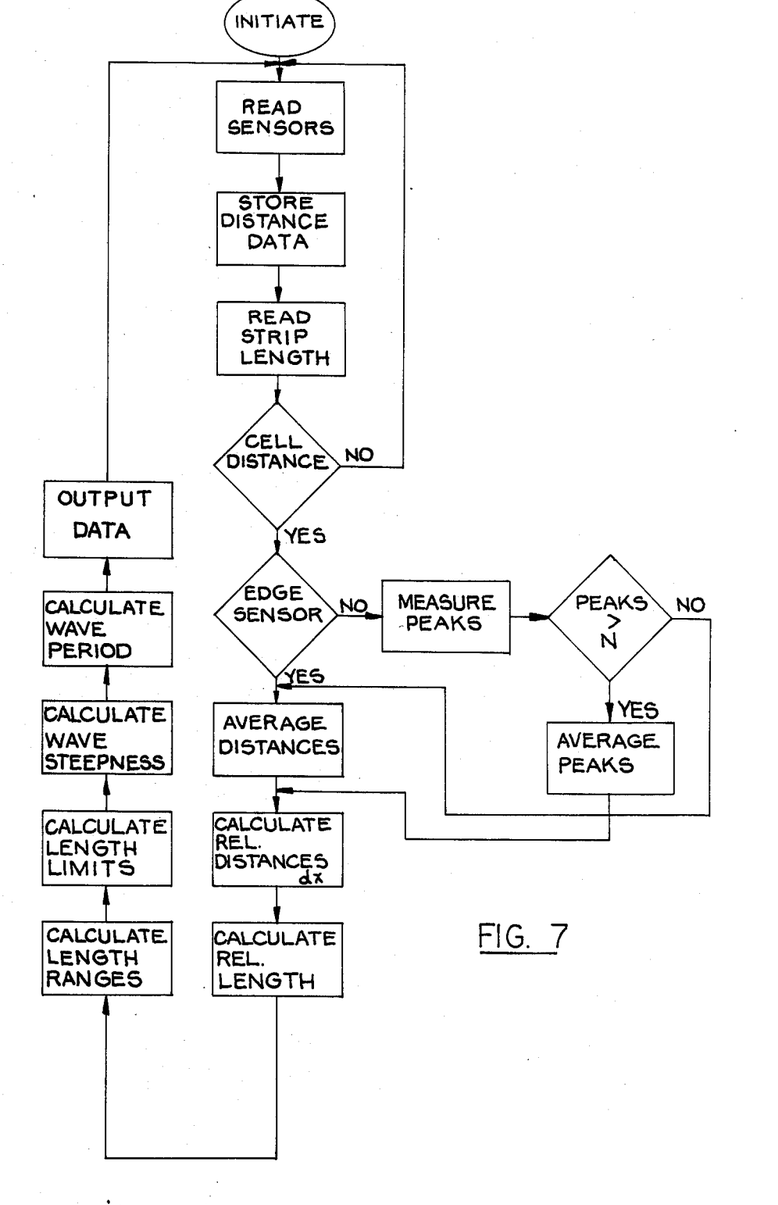
FIG. 7 is a flow diagram illustrating the processing for processor 100.

A flow diagram of the processing associated with processor 100 is illustrated in FIG. 7. It will be understood that this flow diagram may be reduced to a program which can be stored as firmware in a suitable ROM or other storage device associated with processor 100. For example, where processor 100 is implemented as a microprocessor or microcomputer, the program may be stored in a ROM 100a while memory and accumulating functions may be carried out through a RAM (Random Access Memory) 100b as illustrated in FIG. 2. Arithmetic functions such as calculating, converting, averaging, referencing, detecting, counting, selecting, etc., as described hereinafter, may be handled through the ALU (Arithmetic Logic Unit) 100c of the microcomputer, also as illustrated in FIG. 2.

After initiating the system, the data from each of the sensors 1A–1C representing the strip to sensor distance is read and stored. For example, in a typical processor, 80–100 distance measurements per second may be read and stored. As illustrated in FIG. 6, one of the sensors (sensor 1A) has been positioned at one extreme edge of the strip corresponding to position 1 described hereinabove, and thus monitors the instantaneous distance between it and the strip surface at the strip edge. Likewise, a second sensor (sensor 1C) has been positioned at the other extreme edge of the strip, corresponding to position 3 described hereinabove, a and operates to monitor the instantaneous distance between itself and the other strip edge. Finally, a third sensor (sensor 1B) has been positioned between sensor 1A and sensor 1C along the midline of the strip, corresponding to position 2 described hereinabove, and operates to monitor the instantaneous distance between itself and the strip surface along the longitudinal median of the strip. Consequently, the data inputted to processor 100 from each of the sensors may be different, depending upon the particular strip profile at a particular point in time.

Returning to the processing of FIG. 7, the incremental length of strip travel is read, and a test made to determine whether a predetermined length, defined as the "cell distance" has been reached. For example, in the preferred embodiment described herein, the system accumulates data from the three sensors for a predetermined length of strip travel, e.g. 200 feet 61 m.), corresponding to the cell distance. As will be explained in more detail hereinafter, the distances accumulated for each of the sensors are averaged over the cell distance to provide an average value of sensor to strip distance for that cell.

The data accumulation continues until the predetermined cell distance is reached. At this point, the processing branches and separately processes the distance data from the edge sensors at positions 1 and 3, and the center sensor at position 2. In the case of the two edge sensors, the distance measurements accumulated for each of the edge sensors over the cell distance are merely averaged. This is generally satisfactory since it has been found from practice that any non-flat characteristics of the edges comprise "droop" rather than a substantial degree of waviness.

However, practice has found that the situation may be quite different for the central portion of the strip, which in many instances exhibits a substantial degree of waviness. Under these conditions, the average value of strip to sensor distance is better described by considering the wave peaks or valleys, rather than the nominal measurement distance. As used herein, "peak" is used to refer to the maximum distance between the sensor and the strip surface.

Consequently, in the preferred processing illustrated in FIG. 7, the processing branches for data accumulated from the center sensor, wherein peak or valley distances, i.e. data maximums or minimums, are measured and stored. A count is then made of the number of peaks occuring within the cell distance which provides a measure of the relative "waviness" of the central portion of the strip. If the number of peaks within the cell distance exceeds a predetermined number N, the processing calculates the average of the peak values. However, if less than the predetermined number N peaks has occured during the cell distance, indicating a less severe waviness condition, the nominal distances as monitored by the central sensor are averaged, rather than the peak values. In other words, under conditions where the waviness of the central portion of the strip is not severe or non-existent, the data accumulated by processor 100 from the central sensor is treated in the same manner as the data accumulated from the edge sensors. In any event, the average distance so calculated for each cell distance is then used in the calculations described hereinafter to determine the relative length of elongation of the strip S.

It will be understood, however, that in some applications it may be necessary to analyze strip shapes in which one or both edge portions (and perhaps the central portion as well) exhibit a substantial degree of waviness. In this case, the processsing may be modified to test the number of such peaks occurring in a cell for the edge sensors as well, and utilize such peak values (rather than the nominal values) in calculating an average strip to sensor distance for the edge sensor distance values, in the same manner as described for the processing associated with the distance data from the central sensor.

The relative length or elongation of the strip is determined by considering the geometric relationship between the average distances measured by sensors 1A-1C, for example, and the free hanging length L of strip S in catenary distance L.

It is assumed that the catenary distance L is the horizontal distance between the parallel axes of rotation of rollers 29 and 31. If there is a substantial degree of wrapping of the strip S around either roller 29 or 31, the value L of the catenary distance may need to be modified depending upon the degree of wrap and the radius of the roll. Furthermore, as noted above, it is assumed that the strip S is not under excess tension, which could result in elastic deformation distorting the relative length. In other words, under such a condition, the shorter portion of the strip will be deformed most since the tension is higher, thus tending to make the relative elongation of length of the strip appear less than is really the case.

As illustrated in FIG. 5, the distance between a particular sensor and the upper surface of the strip S at the midpoint of the catenary curve, i.e. at a distance $\frac{1}{2}$L from rollers 29 and 31, for a particular transverse position X along the strip width, is defined to be the value $d_x$. In addition, the linear distance measured from the point of contact of strip S with roller 29 or 31 to the surface of the strip at its midpoint (i.e. at a distance $\frac{1}{2}$L from the axes of rotation of rollers 29 or 31) is defined as a quantity $\frac{1}{2}$L +dL, where dL is the incremental length or elongation at the position X. Consequently, these relationships may be trigonometrically arranged to form the three sides of a right triangle wherein the short vertical leg of the triangle is the distance $d_x$, the long horizontal leg of the triangle is the distance $\frac{1}{2}$L, and the hypotenuse of the triangle is the distance $\frac{1}{2}$L +dL.

Since the relative elongation or strip length is desired, one of the sensor distance values $d_x$ is used as a reference value $d_{ref}$, and subtracted from the values of $d_x$ measured at the other sensor positions in order to eliminate common effects such as strip tension, vibration, etc. Consequently, the relative distance between the sensor and strip surface at two of the sensor positions is $d_x - d_{ref}$ with respect to the distance at the other sensor position. In the preferred embodiment described herein, the shortest strip to sensor distance measured by the three sensors for each cell distance is used as the reference distance $d_{ref}$. However, any strip to sensor distance can be used as the reference distance $d_{ref}$.

By applying these relationships in the Pythagorean Theorem and rearranging terms, it can be shown that the incremental length $dL_x$ at a particular position X is given by the relationship:

$$dL_x = [(\tfrac{1}{2}L)^2 + (d_x - d_{ref})^2]^{\frac{1}{2}} - \tfrac{1}{2}L$$

Similarly, the incremental length $dL_{ref}$ at the reference position $X_{ref}$ is given by the relationship:

$$dL_{ref} = [(\tfrac{1}{2}L)^2 + (d_{ref})^2]^{\frac{1}{2}} - \tfrac{1}{2}L$$

Consequently, the percentage relative length or elongation at any position X can be calculated from the relationship:

$$\frac{dL_x}{dL_{ref} + \tfrac{1}{2}L} \times 100 =$$

$$\frac{\left[\left[(d_x - d_{ref})^2 + \left(\tfrac{1}{2}L\right)^2\right]^{\frac{1}{2}} - \tfrac{1}{2}L\right]}{\left[(d_{ref})^2 + \left(\tfrac{1}{2}L\right)^2\right]^{\frac{1}{2}}} \times 100$$

For example, for the situation illustrated in FIG. 1B, the reference position will be position 2 since the average value of the distance between sensor 1B and the strip surface is smallest. Consequently, the percent relative length or elongation at position 1 is given by the relationship:

$$\frac{\left[(d_1 - d_2)^2 + \left(\tfrac{1}{2}L\right)^2\right]^{\frac{1}{2}} - \tfrac{1}{2}L}{\left[d_2^2 + \left(\tfrac{1}{2}L\right)^2\right]^{\frac{1}{2}}}$$

Where:
$d_1$ = the average distance between sensor 1A and the strip surface.
$d_2$ = the average distance between sensor 1B and the strip surface.

For this specific condition, the value of percent relative length at position 1 will have a value greater than 100%, since the length of this edge is longer than the center portion, thereby causing the edge to droop.

Similarly, again for the condition illustrated in FIG. 1B, the percent relative length at position 3 can be calculated from the relationship:

$$\frac{\left[(d_3 - d_2)^2 + \left(\tfrac{1}{2}L\right)^2\right]^{\frac{1}{2}} - \tfrac{1}{2}L}{\left[d_2^2 + \left(\tfrac{1}{2}L\right)^2\right]^{\frac{1}{2}}}$$

Where:
$d_2$ = the average distance between sensor 1B and the strip surface.
$d_3$ = the average distance between sensor 1C and the strip surface.

Again, for the condition illustrated in FIG. 1B, this calculated value of percent relative length at position 3 will have a value greater than 100%, since

TABLE I

| LENGTH INCREMENT | | PERCENT RELATIVE LENGTH | | |
| --- | --- | --- | --- | --- |
| | | SENSOR 1A | SENSOR 1B | SENSOR 1C |
| 0. | 200. | 0.00 | 0.69 | 0.29 |
| 200. | 400. | 0.00 | 0.28 | 0.26 |
| 400. | 600. | 0.00 | 0.41 | 0.09 |
| 600. | 800. | 0.00 | 0.21 | 0.06 |
| 800. | 1000. | 0.00 | 0.21 | 0.08 |
| 1000. | 1200. | 0.00 | 0.21 | 0.08 |
| 1200. | 1400. | 0.00 | 0.21 | 0.08 |
| 1400. | 1600. | 0.00 | 0.22 | 0.09 |
| 1600. | 1800. | 0.00 | 0.56 | 0.33 |
| 1800. | 2000. | 0.00 | 0.69 | 0.43 |
| 2000. | 2200. | 0.00 | 0.25 | 0.17 |
| 2200. | 2400. | 0.00 | 0.22 | 0.13 |
| 2400. | 2600. | 0.00 | 0.22 | 0.11 |
| 2600. | 2800. | 0.00 | 0.23 | 0.10 |
| 2800. | 3000. | 0.00 | 0.23 | 0.12 |
| 3000. | 3200. | 0.00 | 0.23 | 0.11 |
| 3200. | 3400. | 0.00 | 0.25 | 0.15 |
| 3400. | 3600. | 0.00 | 0.23 | 0.13 |
| 3600. | 3800. | 0.00 | 0.22 | 0.12 |
| 3800. | 4000. | 0.00 | 0.26 | 0.21 |
| 4000. | 4200. | 0.00 | 0.23 | 0.14 |
| 4200. | 4400. | 0.00 | 0.23 | 0.14 |
| 4400. | 4600. | 0.00 | 0.23 | 0.12 |
| 4600. | 4800. | 0.00 | 0.24 | 0.15 |
| 4800. | 5000. | 0.00 | 0.26 | 0.17 |
| 5000. | 5200. | 0.00 | 0.25 | 0.14 |
| 5200. | 5400. | 0.00 | 0.23 | 0.12 |
| 5400. | 5600. | 0.00 | 0.27 | 0.20 |
| 5600. | 5800. | 0.00 | 0.26 | 0.18 |
| 5800. | 6000. | 0.00 | 0.27 | 0.22 |
| 6000. | 6200. | 0.00 | 0.27 | 0.23 |
| 6200. | 6400. | 0.00 | 0.30 | 0.30 |
| 6400. | 6600. | 0.00 | 0.30 | 0.30 |
| 6600. | 6800. | 0.00 | 0.28 | 0.25 |
| 6800. | 7000. | 0.00 | 0.28 | 0.22 |
| 7000. | 7200. | 0.00 | 0.28 | 0.24 |
| 7200. | 7400. | 0.00 | 0.28 | 0.21 |
| 7400. | 7600. | 0.00 | 0.29 | 0.22 |
| 7600. | 7800. | 0.00 | 0.32 | 0.30 |
| 7800. | 8000. | 0.00 | 0.29 | 0.25 |
| 8000. | 8200. | 0.00 | 0.30 | 0.27 |
| 8200. | 8400. | 0.00 | 0.31 | 0.30 |
| 8400. | 8600. | 0.00 | 0.32 | 0.30 |
| 8600. | 8800. | 0.00 | 0.39 | 0.49 |
| 8800. | 9000. | 0.00 | 0.33 | 0.38 |
| 9000. | 9200. | 0.00 | 0.36 | 0.44 |
| 9200. | 9400. | 0.00 | 0.35 | 0.42 |
| 9400. | 9600. | 0.00 | 0.36 | 0.45 |
| 9600. | 9800. | 0.00 | 0.36 | 0.43 |
| 9800. | 10000. | 0.00 | 0.35 | 0.41 |
| 10000. | 10200. | 0.00 | 0.35 | 0.41 |
| 10200. | 10400. | 0.00 | 0.40 | 0.53 |
| 10400. | 10600. | 0.00 | 0.37 | 0.46 |
| 10600. | 10800. | 0.00 | 0.38 | 0.49 |
| 10800. | 11000. | 0.00 | 0.37 | 0.49 |
| 11000. | 11200. | 0.00 | 0.38 | 0.49 |
| 11200. | 11400. | 0.00 | 0.41 | 0.54 |
| 11400. | 11600. | 0.00 | 0.47 | 0.59 |
| 11600. | 11800. | 0.00 | 0.46 | 0.57 |
| 11800. | 12000. | 0.00 | 0.47 | 0.62 |
| 12000. | 12200. | 0.00 | 0.47 | 0.62 |
| 12200. | 12400. | 0.00 | 0.46 | 0.56 |
| 12400. | 12600. | 0.00 | 0.45 | 0.55 |
| 12600. | 12800. | 0.00 | 0.44 | 0.56 |
| 12800. | 13000. | 0.00 | 0.44 | 0.58 |
| 13000. | 13200. | 0.00 | 0.47 | 0.63 |
| 13200. | 13400. | 0.00 | 0.43 | 0.56 |
| 13400. | 13600. | 0.00 | 0.43 | 0.54 |
| 13600. | 13739. | 0.00 | 0.47 | 0.54 |

Returning to the flow processing of FIG. 7, after the relative lengths have been calculated, the results may be stored in a suitable storage media for future analysis, or may be used immediately for correcting some aspect of the strip processing. The processing then returns and begins accumulating sensor and strip distance data for the next cell distance.

Table I illustrates a typical data output of percent relative length for a 13,739 foot length of strip steel which was obtained utilizing the present invention.

In this Table, the percent relative length has been calculated for each cell comprising a length increment of 200 feet. It will be observed that the last length increment is only 139 feet, rather than a full cell length.

In this example, the minimum distance between a sensor and the strip surface occurred for sensor 1A in all cases. Consquently, sensor 1A was designated as the reference position, resulting in a zero percent relative length at sensor 1A.

The remaining data illustrates the percent relative length for sensor 1B which varies between about 0.21% and 0.69%, while the relative length at position 3 varies between about 0.06% and 0.63%. Consequently, it can be seen that in the first cell (length increment 0–200 feet) the strip edge adjacent position 3 is longer than the strip edge adjacent position 1, while the center of the strip is longer than either of the edges. This results in a condition where the cross sectional profile of the strip is U-shaped and droops downwardly from position 1. This type of profile persists until approximately length increment 8600 when the position 3 edge of the strip becomes longer than the center portion. This condition, which somewhat resembles the shape profile of FIG. 1D, persists until the end of the strip is reached.

By way of example, in a strip having a width of 36 inches (914 mm.), and a catenary distance of 88 inches (2.24 m.), with a reference distance $d_{ref}$ of one inch and an edge droop of 3 inches (76 mm.), the relative length of the drooping edge is about 0.10%. That is, in a 200 foot (61 m.) length of steel strip, the length of the strip as measured along the drooping edge will be about 2.4 inches (61 mm.) longer than the length of the strip measured along the reference position.

As noted above, this output data may be stored for future analysis, or may be used immediately to affect some change in the strip processing. For example, processor 100 can be utilized to calculate the cumulative percent relative length or elongation between certain limits, for example 0.1% –0.5%. In the example illustrated hereinabove, such a calculation would provide information that 95% of the strip measured at position 2 lies within this range, while only 79 percent of the strip measured at position 3 lies within this range. Alternatively, the processing may establish a predetermined limit, e.g. 0.5%, and activate an alarm or cause some processing change to occur if the percent relative length at any of the sensor position exceeds this predetermined value. As another alternative, the processing may include additional calculation capabilities to derive the slope of wavy portions of the strip in order to obtain an indication of the "steepness" of the waves, or to calculate the period of waves or other non-flatness characteristics so that the type of distortion in the strip can be characterized.

It will be understood that various details in the changes, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. Apparatus for continuously measuring the relative elongation of a strip of electrically conducting material of indefinite length moving along the path of travel at a predetermined speed comprising:
   means for supporting the strip such that the actual transverse profile of the strip reflects the true transverse profile of the strip over a predetermined distance;
   means including first non-contact sensor means proximate the strip for measuring a first distance between said sensor means and a first position on a major surface of the moving strip within said predetermined distance;
   second means including second non-contact sensor means proximate the strip for measuring a second distance between said second sensor means and a second position on the same surface of the moving strip different from said first position and within said predetermined distance; and
   means for calculating from said first and second distance measurements the elongation of the strip in the direction of strip travel at said second position relative to said first position.

2. The apparatus according to claim 1 wherein said support means supports the moving strip such that the strip forms a catenary curve within said predetermined distance.

3. The apparatus according to claim 2 wherein said support means comprises a pair of spaced supports configured and positioned so that the moving strip hangs freely in said catenary curve between the supports.

4. The apparatus according to claim 3 wherein said supports comprise rotatably mounted rollers supporting the underside of the strip and positioned at substantially the same vertical height and having their axes of rotation parallel and perpendicular to the path of travel of the strip.

5. The apparatus according to claim 1 wherein each of said sensor means comprises means for measuring the capacitance between the sensor means and said major surface of the strip, said measuring means including means for converting said capacitance measurement to a value representative of said distance measurement.

6. The apparatus according to claim 5 including at least one of said sensors positioned in overlying relationship with the strip and adjacent to the marginal edges and the longitudinal center line of the strip for measuring the relative elongation along the center and edge portions of the strip.

7. The apparatus according to claim 1 wherein said calculating means comprises:
   means for accumulating distance measurements from each of said sensors;
   means for averaging said distance measurements for each sensor to obtain first and second distance values, $d_1$ and $d_2$, respectively, averaged over a predetermined cell length of the strip;
   means for referencing said second average distance value to said first average distance value; and
   means for calculating said relative elongation from said first and second average distance values.

8. The apparatus according to claim 7 wherein said calculating means includes means for detecting the presence of peaks occurring in the surface of the strip.

9. The apparatus according to claim 8 wherein said peak detecting means includes means for accumulating the peak distances measured by said measuring means and means for counting the number of peaks occuring within a predetermined strip length.

10. The apparatus according to claim 9 wherein one of said sensors is positioned along the longitudinal medial portion of the strip, said peak detecting means being responsive only to distance measurements from said one sensor.

11. The apparatus according to claim 7 wherein said calculating means includes means for selecting any average distance value as said reference average distance value.

12. The apparatus according to claim 7 wherein said support means comprises a pair of support members spaced a distance L apart and supporting said strip so that it hangs in a catenary curve between the support members, said sensors being positioned at a distance L/2 from said support members, said calculating means including means for calculating the relative length of the strip at said second position from the relationship:

$$\frac{\left[(d_2 - d_1)^2 + \left(\frac{1}{2}L\right)^2\right]^{\frac{1}{2}} - \frac{1}{2}L}{\left[d_1^2 + \left(\frac{1}{2}L\right)^2\right]^{\frac{1}{2}}}$$

13. The apparatus according to claim 1 wherein said calculating means includes means for detecting the presence of peaks occurring in the surface of the strip.

14. Apparatus for continuously measuring the relative length of a strip of electrically conducting material of indefinite length moving along a path of travel at a predetermined speed comprising:
   a pair of support members spaced a distance L apart and supporting the strip so that it hangs freely in a catenary curve between the support members so that the actual transverse profile of the strip reflects the true transverse profile of the strip at at least one location between the support members;
   a first sensor positioned at a true profile location for measuring the distance value $d_1$ between said sensor and a first position on a major surface of the moving strip;
   a second sensor positioned at a true profile location for measuring a distance value $d_2$ between said second sensor and a second position different from said first position on said major surface of the moving strip; and
   processing means for calculating from said $d_1$ and $d_2$ values the relative length of the strip in the direction of strip travel at said second position with respect to said first position.

15. The apparatus according to claim 14 wherein said processing means includes means for selecting the smaller of the distance value $d_1$ and $d_2$ as the value $d_1$.

16. The apparatus according to claim 14 including means for measuring strip length passing said sensors and wherein said processing means includes:
   memory means for accumulating said $d_1$ and $d_2$ values;
   means for individually averaging said $d_1$ and $d_2$ values over a predetermined strip cell length to obtain average values of $d_1$ and $d_2$;
   means for referencing said average value of $d_2$ to said average value of $d_1$; and means for calculating from said average $d_1$ and $d_2$ values the relative length of the strip of said second position in the direction of strip travel.

17. The apparatus according to claim 16 wherein said sensors are positioned at the mid-point of said catenary curve such that the distance from said sensors to said support members is L/2, said calculating means including means for calculating the relative length of the strip at said second position from the relationship:

$$\frac{\left[(d_2 - d_1)^2 + \left(\frac{1}{2}L\right)^2\right]^{\frac{1}{2}} - \frac{1}{2}L}{\left[d_1^2 + \left(\frac{1}{2}L\right)^2\right]^{\frac{1}{2}}}$$

18. The apparatus according to claim 17 wherein one of said sensors is positioned adjacent the marginal edge of the strip and the other of said sensors is positioned adjacent the longitudinal medial portion of the strip.

19. The apparatus according to claim 18 wherein said calculating means includes means for detecting the presence of peaks occurring in the surface of the strip.

20. The apparatus according to claim 19 wherein said peak detecting means includes means for accumulating the peak distances measured by said sensors and means for counting the number of peaks occurring within a predetermined strip length and said averaging means includes means for averaging said peak distances to obtain an average distance value in the event that said number of peaks exceeds a predetermined value.

21. The apparatus according to claim 20 wherein one of said sensors is positioned along the longitudinal medial portion of the strip, said peak detecting means being responsive only to distance measurements from said one sensor.

22. The apparatus according to claim 21 where each of said sensors comprises means for measuring the capacitance between the sensor and the major surface of the strip, and including means for converting said capacitance measurement to a value representative of said distance measurement.

23. The apparatus according to claim 18 including means for calculating wave steepness.

24. The apparatus according to claim 18 including means for calculating wave periodicity.

25. The apparatus according to claim 18 wherein each of said sensor means comprises means for measuring the capacitance between the sensor means and said major surface of the strip, and means for converting said capacitance measurement to a value representative of said distance measurement.

26. The apparatus according to claim 18 including means for calculating the relative number of cells having relative lengths lying within predetermined ranges.

27. The apparatus according to claim 18 including means for determining when the relative length exceeds a predetermined value.

* * * * *